United States Patent [19]
Fletcher et al.

[11] 3,831,098
[45] Aug. 20, 1974

[54] PULSE STRETCHER FOR NARROW PULSES

[76] Inventors: James C. Fletcher, Administrator of the National Aeronautics and Space Administration, with respect to an invention by; Reed S. Lindsey, Jr., 1002 Antoine, Apt. 15, Houston, Tex. 77055

[22] Filed: June 25, 1973

[21] Appl. No.: 373,587

[52] U.S. Cl. ................................ 328/58, 307/267
[51] Int. Cl. ........................................... H03k 5/04
[58] Field of Search ...................... 307/267; 328/58

[56] References Cited
UNITED STATES PATENTS
3,602,825  8/1971  Senior ................................ 307/267
3,659,211  4/1972  Norton ................................ 307/267

OTHER PUBLICATIONS
"Gated Pulse Stretcher" by Cochrane in IBM Tech. Disc. Bulletin, Vol. 12, No. 3, Aug. 1969, pages 404-405.

Primary Examiner—Stanley D. Miller, Jr.
Attorney, Agent, or Firm—Marvin J. Marnock; Marvin F. Matthews; John R. Manning

[57] ABSTRACT

A pulse stretcher for narrow pulses comprising an analog section for processing each arriving analog pulse and a digital section having logic for providing command signals to the gates and switches in the analog section.

7 Claims, 3 Drawing Figures

PULSE STRETCHER DIGITAL SECTION

PULSE STRETCHER FOR NARROW PULSES

ORIGIN OF THE INVENTION

The invention described herein was made in the performance of work under a MASA contract and is subject to the provisions of Section 305 of the National Aeronautics and Space Act of 1958, Public Law 85–568 (72 Stat. 435; 45 U.S.C. 2457).

BACKGROUND OF THE INVENTION

Commercially available pulse type analyzers cannot reliably process trains of very narrow pulses (less than 1 microsecond at the base line).

Recent scientific instruments have been found to generate signals composed of narrow pulses whose rate of arrival is so great that special shaping thereof is necessary in order to reduce the probability of pulse overlapping and to permit commercially available pulse height analyzers to record the amplitude spectrum of the pulses.

For example, special pulse generators such as detectors in nuclear radiation instruments can produce very narrow pulses. Such detectors are subjected to the bombardment by nuclear particle radiation. The generated pulses carry information concerning the particles' physical state such as energy levels, flux density, etc. The pulses result from energy losses suffered by the particles as they interact with the atomic structure of the detector. While each detector's interaction mechanism varies somewhat for different type detectors, the energy lost by the particles is represented by the amplitude of the pulses generated by the detector. When semi-conductor detectors are employed, the charge collection time, which is the interaction time between the particles and the detector, is usually very short, say on the order of a few nanoseconds.

Recently, applications have been developed in which the movements of the atomic particles have a high rate of occurrence per unit area (high flux density). Accordingly, the corresponding pulses have a high pulse rate. Also, the electronic networks coupled to the pulse generating detectors must be sufficiently fast and contain very short filter time constants in order to properly process these fast pulses, thereby preventing one pulse from interfering with its neighboring pulse.

Such electronic networks must slow down the pulses arriving from the detectors by lengthening (stretching) their duration, thus making it possible to analyze the pulses with conventional pulse height analyzers.

Commercially available and otherwise known pulse stretchers are not adapted to linearly stretch very narrow pulses (less than 1 microsecond wide), and they suffer from several drawbacks: they have high degree of non-linearity when handling narrow pulses; they lack in sensitivity and versatility. It has been found that the rate of arrival of narrow pulses is too great for commercially available pulse stretchers and accordingly there is a need for special shaping of such narrow pulses, thereby reducing pulse overlapping.

Accordingly, it is a broad object of the present invention to provide a pulse stretcher for very narrow pulses which has particular application as an interface between the output of narrow pulse generators and conventional pulse handling instruments.

It is a more specific object of the present invention to provide an improved pulse stretcher whose timing is sufficiently fast to detect each narrow pulse, process the pulse, store or telemeter the pulse, and at the same time get ready to accept the next pulse. The pulse stretcher of this invention can provide its output to existing pulse height analyzers to enable them to handle wide bandwidth pulses having an overall duration of one microsecond or less.

SUMMARY OF THE INVENTION

This invention relates to a very narrow pulse stretcher adapted to serve as an interface between narrow pulse generators and conventional instruments such as pulse height analyzers. The pulse stretcher of this invention includes an analog, or linear section and a digital or decision making section. The analog section delays the incoming pulse to allow the digital section to decide upon the disposition of the pulse event. If the decision is made to process this event, the pulse peak is detected and held for a selectable time interval. Meanwhile the digital section, through logic commands, disallows succeeding pulses to pile-up upon the detected peak amplitude. The digital section then commands a linear gate, located within the analog section, to produce an output pulse whose amplitude is directly proportional to the pulse peak height but whose pulse shape is compatible with ordinary pulse height analyzers. The digital section then resets the analog section to process a new event and opens it's input linear gate, provided a new pulse is not then in progress. If a new pulse is present its processing is specifically disallowed since its peak might have already passed and processing would result in an incorrect observation. Monitor outputs located in the digital section allow one to measure the total number of input pulses and the number of events processed. An additional input allows the following pulse height analyzer to inhibit operation of the stretcher during it's operation to prevent pile-up at the analyzer interface due to assynchronous operation of the two instruments.

Figure 1:
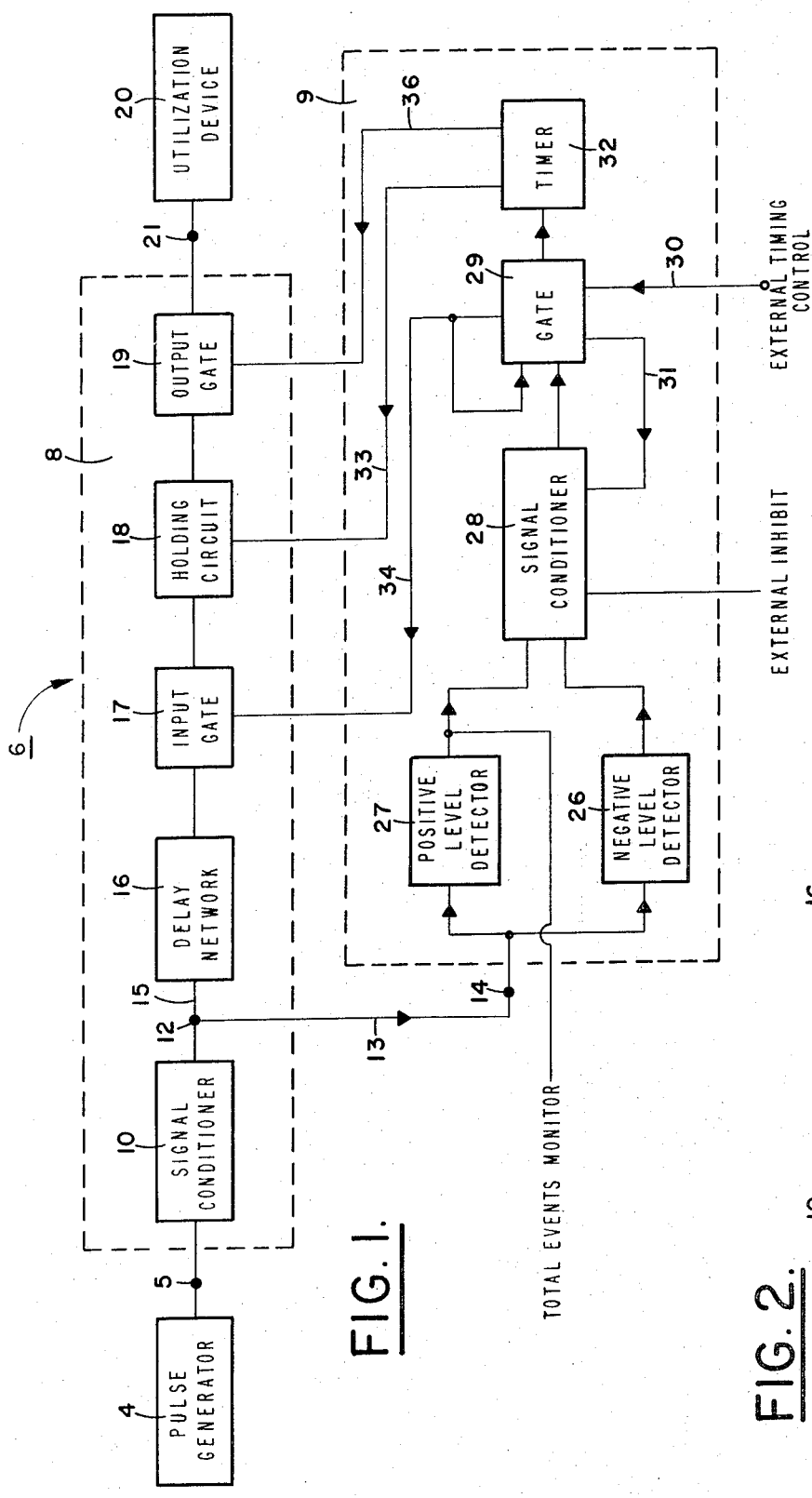
FIG. 1 is a simplified block diagram of the pulse stretcher of this invention.

Referring now to the drawings wherein the same numerals designate the same or similar parts, the pulse generator 4 forming no part of this invention provides to the input 5 of the pulse stretcher 6 of this invention pulses which can be unipolar or bipolar. It will be assumed that the pulse generator's unipolar signal is positive or that the first lobe of the bypolar signal is also positive. This assumption is to facilitate the subsequent exposition, but is in no way limitative of the invention.

The pulse stretcher 6 generally comprises an analog section 8 for processing each arriving analog pulse. A digital section 9 provides all the signal conditioning logic by operating on linear gates and switches within the analog section.

The incoming pulses on terminal 5 are applied to a signal conditioning network 10 which may comprise an active network to attenuate each arriving pulse and an integrated circuit voltage follower. From the output terminal 12 of signal conditioner 10, the pulses are fed through line 13 to the input terminal 14 of the digital section, and through line 15 to a delay network 16. From the delay network the signal is applied to an input linear gate 17 which delays the signal by a predetermined time delay of approximately 0.5 microseconds with respect to the input signal. The delay provided by delay network 16 allows sufficient time for the digital section logic to gate in the necessary commands to the analog section.

Accordingly, any pulse which is supplied to input terminal 5 immediately after the first pulse or at any time during the period the first pulse is being processed will be blocked by the closed gate 17. When the input linear gate 17 is open, the signal is fed to a very fast pulse peak-holding circuit 18. The holding circuit's function is to change the characteristics of the very narrow pulses, say as narrow as 50 nsec, in such a manner as to produce unipolar pulses which can be handled without distortion by a utilization circuit 20, such as a pulse height analyzer.

The output of the holding circuit 18 is gated by a linear output gate 19 whose timing is controlled by the logic of the digital section. The holding circuit 18 serves a critical function in the pulse stretcher of this invention inasmuch as the stretching of the signal pulse by the holding circuit must be done with the highest degree of linearity and by the exclusion of switching spikes or other types of noise. The duration of the unipolar signal coming out of the holding circuit 18 is dictated by a dump command signal sent by the digital section. The signal at the output terminal 21 of the pulse stretcher has a positive polarity and has its base line at zero D.C. volts.

The digital section logic is arranged to insure the proper processing of one and only one analog pulse signal at a time through the analog section. The digital section keeps the two linear gates 17 and 19 closed at all times except under certain conditions subsequently described. From the input terminal 14 to the digital section, the undelayed arriving analog pulse is applied to the inputs of two level detectors or discriminators. Discriminator 26 is triggered if the first lobe of the pulse is negative, and discriminator 27 is triggered if the first lobe of the pulse is positive. The digital section logic is arranged to permit the processing of very narrow input signal pulses occupying a wide bandwidth and to discard all false or undesirable signals which normally occur due to noise, pulse pile-up, switching spikes, multiple events, pulse undershoot, overshoot, etc.

From the outputs of both discriminators the signals are applied to a signal conditioner 28 which buffers, inverts, and times the output from at least one of the discriminators in a manner subsequently described in greater detail. The output of the signal conditioner 28 is applied to a gate 29 whose timing can be externally controlled by a line 30. The opening and closing times of gate 29 are controlled by a plurality of internal conditional inhibitor lines 31.

When gate 29 does produce an output it starts a timer 32 which provides on line 33 a dump signal for the holding circuit 18 in the analog section. The timer's output ingate signal on line 34 controls the input linear gate 17 and is also fed to the input of gate 29 to inhibit any other input signals from being processed during a predetermined time interval. Timer 32 also controls the leading edge delay and width of the outgate pulse applied on line 36 to the output linear gate 19 in the analog section. The leading edge delay and the width of this control pulse can be adjusted from 0.5 to 5.0 microseconds and from 1.0 to 10 microseconds, respectively. Timer 32 also controls the trailing edge of the dump pulse applied on line 33 and the timing of the dump pulse is initiated as the output linear gate 19 is closed.

The analog and digital sections 8 and 9 will now be described in more detail with reference to FIGS. 2 and 3, respectively. The shape of the analog signal at key points is represented by a curve opposite to that point. On the vertical axis is plotted amplitude and on the horizontal time.

Figure 2:
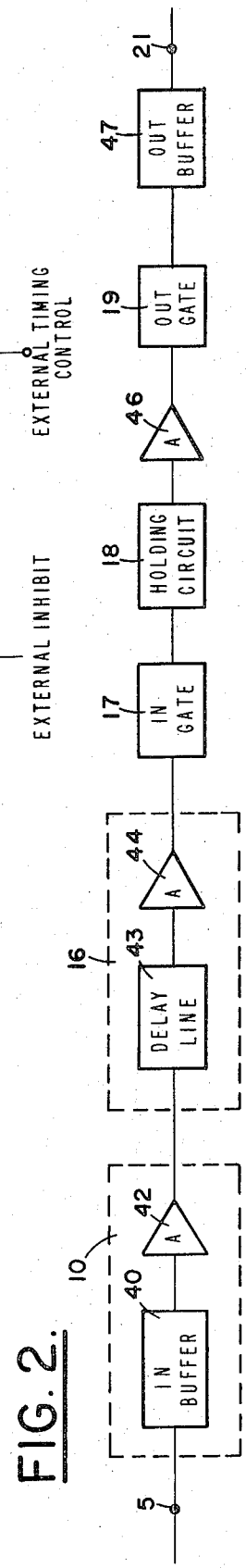
FIG. 2 is a block diagram of the analog section of the pulse stretcher of this invention.

In FIG. 2 the signal conditioning network 10 includes a buffer 40 and a variable gain, inverting amplifier 42. The delay network 16 comprises a passive delay line 43 providing a time delay $t_d$ which is approximately 0.5 microseconds in length and an invertering amplifier 44 which amplifies the delayed signal and applied it to the input linear gate 17 in which the delayed signal is gated during a time interval $t_{gi}$. Accordingly, the output signal pulse from gate 17 has the same polarity as the arriving pulse on input terminal 5, except that the pulse signal is now amplified and delayed by 0.5 microseconds.

When gate 17 is open, the pulse can pass therethrough to the very fast, pulse-peak holding circuit 18. From the holding circuit 18 the pulse is fed to an inverting amplifier 46 having unity gain and serving as a buffer between the holding circuit and the output linear gate 19. The output from gate 19 will take place only when the gate is open during a time interval $t_{go}$. The gated pulse is then applied to an output buffer 47 whose output is terminal 21 of the pulse stretcher 6 of this invention.

Figure 3:
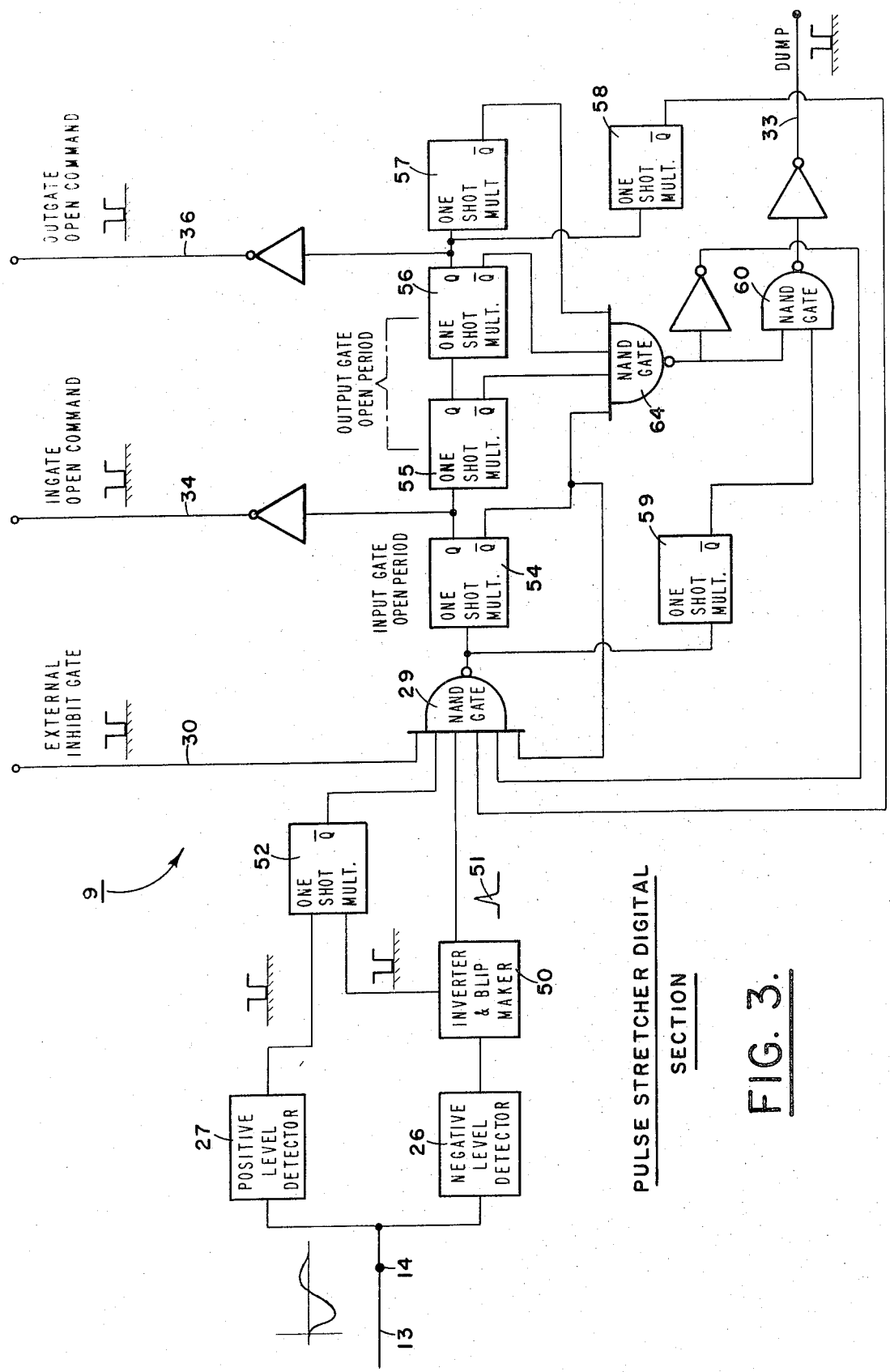
FIG. 3 is a block diagram of the digital section of the pulse stretcher of this invention.

With reference now to FIG. 3, the digital section includes the pulse height discriminators 26 and 27 previously described. Discriminator 26 is triggered by the negative going portion of the arriving pulse and discriminator 27 is triggered by the positive going portion of the pulse. The output of detector 26 is fed to an inverter and pulse generator 50 which inverts the output of the negative detector 26 and also generates a pulse 51 of say 30 nsec which occurs at the leading edge of the output pulse from detector 26 and which indicates that the amplitude of the incoming analog pulse exceeds a predetermined threshold level.

The inverted pulse from inverter 50 and the output pulse from detector 27 are applied to one-shot multivibrator 52 whose output is fed to one of six inputs into NAND gate 29. The output of inverter 50 is applied to another input of gate 29. The other inputs, except for external line 30, arrive from timer 32 comprising six one-shot multivibrators 54–59.

The narrow pulse signal going from high to low at the output of gate 29 is applied to multivibrators 54 and 59. As soon as this pulse changes from high to low, the outputs of multivibrators 54 and 59 will generate one-shot periods which are internally adjustable from 1.5 to 5.0 microseconds. The output pulse from 59 is gated by a NAND gate 60 and forms the dump pulse on line 33.

The output pulse from 54 feeds line 34 to open or close the input linear gate 17. It is also applied to multivibrator 55 which, together with multivibrator 56, provides the command signal for output gate 19 on line 36. A NAND gate 64 has four inputs from multivibrators 54–57. The input from multivibrator 54 is tied to one of the inputs to gate 29. The output of gate 64 controls gate 60 and also constitutes one input to gate 29.

In operation of the pulse stretcher 6, the digital section logic is arranged to guarantee the proper processing of one and only one analog pulse at any one time. This is done by keeping the two linear gates 17 and 19 closed at all times except when all of the following conditions are met:
1. the incoming analog pulse has sufficient amplitude to trigger the negative discriminator 27,
2. a minimum period of time has elapsed since the processing of a preceding pulse, and
3. a high level input signal is provided to external line 30 of gate 29.

From the output of both detectors 26 and 27 the signals are fed to the one-shot multivibrator 52 which has the function of rejecting the processing of incoming pulses unless certain conditions are again met;
1. a true pulse has been detected by the detectors; and
2. a sufficiently long time period has elapsed since the processing of the last pulse.

When the conditional inhibitor inputs to NAND gate 29 are all high and at the same time the narrow pulse 51 is present going from low to high, then gate 29 will produce an output which starts a sequence of events timed by the chain of six multivibrators 54-59. The narrow pulse signal 51 when going from high to low at the output of gate 29 will cause multivibrators 54 and 59 to generate one-shot periods which are internally adjustable from 0.5 to 5.0 microseconds.

The output from multivibrator 59 is used to form the dump command signal on line 33 to holding circuit 18. The output from multivibrator 54 is used to control the input linear gate 17 in the analog section and is also fed back to the input of gate 29 to inhibit any other input signals from being processed by the analog section during that one-shot period.

Multivibrator 55 controls the leading edge delay and multivibrator 56 controls the width of the command control pulse applied to line 36 for controlling the output linear gate 19 in the analog section. The leading edge delay and width of this control command pulse can be adjusted from 0.5 to 5.0 microseconds and from 1.0 to 10 microseconds, respectively. Multivibrator 57 controls the trailing edge of the dump pulse fed to line 33 in the analog section, and its one-shot period is initiated as the output linear gate 19 is closed. As soon as the dump pulse goes high, all the inputs to the NAND gate 64 are high thereby terminating the holding time by the holding circuit 18.

Accordingly, it can be seen that the output gate 19 is open sometime after the pulse has been held by the holding circuit 18 at its maximum, and the output gate 19 is closed before the holding circuit returns to ground potential. These conditions allow the final output signal to be positioned anywhere between the time the input gate 17 is closed and the return of the holding circuit to ground potential.

In the preferred embodiment the pulse stretcher had the following characteristics.

Pulse height range: 100mV to 5.5 volts. Stretched output pulse width range: Adjustable from 1 microsecond to 10 microsecond. Stretched output pulse delay (with respect to the unstretched input pulse): Adjustable from 1 microsecond to 5.5 microsecond. Maximum random average input pulse repetition rate: 1 Mps. Input pulse shape: Unipolar or bipolar. Input pulse polarity: positive unipolar or positive primary lobe for bipolar. Output signal linearity: 0.015 percent.

What is claimed is:
1. A pulse stretcher for very narrow pulses comprising an analog section for processing each arriving analog pulse and a digital section responsive to the analog signals for providing command signals to the analog section,
   said analog section comprising a delay network for delaying the incoming signal;
   an input gate coupled to the delay network and being responsive to an ingate command signal from said digital section;
   a holding circuit coupled to said input gate and being responsive to a dump command signal from said digital section; and
   an output gate coupled to said holding circuit and being responsive to an outgate command signal from said digital section for providing a delayed and stretched output signal;
   said digital section comprising at least one detector having a predetermined threshold level for detecting the level of each arriving pulse relative to said threshold level;
   a signal conditioner coupled to said one level detector for conditioning the detected signals;
   a timer for providing said ingate, dump, and outgate signals to said analog section, and
   a first gate for gating the output of said signal conditioner to said timer.
2. The pulse stretcher of claim 1 wherein said signal conditioner in said analog section comprises an input buffer and an amplifier coupled to the input buffer.
3. The system of claim 1 wherein said output gate in said analog section is followed by an output buffer.
4. The system of claim 1 wherein said digital section includes another level detector,
   said one level detector being a positive level detector and said other level detector being a negative level detector, and said signal conditioner in said digital section receiving the outputs from both of said level detectors.
5. The system of claim 4 wherein said timer in said digital section includes a plurality of one-shot multivibrators.
6. The system of claim 5 and further including at least another gate for gating the output of at least some of said multivibrators.
7. The system of claim 6 wherein said signal conditioner in said digital section includes,
   an inverter for inverting the output of said negative level detector, and
   a one-shot multivibrator responsive to the output of said inverter and the output of said positive level detector to provide an output to said first gate in said digital section thereby initiating the operation of said timer in said digital section.

* * * * *